United States Patent [15] 3,648,741
Croasdale et al. [45] Mar. 14, 1972

[54] METHOD AND APPARATUS FOR ACCURATELY DISPENSING VISCOUS PRODUCTS INTO SUCCESSIVE CONTAINERS

[72] Inventors: William Herbert Croasdale, Morris Plains; Harlan Sumner French, Phillipsburg, both of N.J.; Clewell Stephen Hofschild, Bethlehem, Pa.; Donald Owen Johnson, Matawan, N.J.

[73] Assignee: American Can Company, New York, N.Y.

[22] Filed: Apr. 23, 1970

[21] Appl. No.: 31,170

[52] U.S. Cl. ................................. 141/9, 141/83, 141/103, 141/196, 177/122, 177/151
[51] Int. Cl. ............................................................. B65b 3/28
[58] Field of Search .................. 141/1, 9, 83, 100, 103, 104, 141/167, 172, 173, 174, 196; 177/1, 52, 122, 123, 151–153

[56] References Cited

UNITED STATES PATENTS

| 2,385,233 | 9/1945 | Robinson | 177/52 |
| 3,073,400 | 1/1963 | Bauder et al. | 141/83 |
| 1,913,743 | 6/1933 | Borchert | 141/103 X |
| 3,448,778 | 6/1969 | Ramsay | 141/83 |

OTHER PUBLICATIONS

German Printed Application 1,275,785, 8–1968, Bahlsen 177/151.

Primary Examiner—Edward J. Earls
Attorney—Robert P. Auber, George P. Ziehmer and Leonard R. Kohan

[57] ABSTRACT

A method and apparatus for accurately dispensing nonuniform viscous food products having both liquid and solid components into successive containers wherein, initially, a manually adjustable filler dispenses approximately one-half of the desired weight of solid product into said containers, next, an automatically adjustable filler dispenses the remaining quantity of solid product into said containers to fill said containers to within a desired solid product weight range, and, finally, a weighing scale senses the total solid product weight and regulates a trim filler to dispense a final increment of liquid product, if needed, to fill said containers to within a desired total product weight range. Also, the weighing scale sends voltage signals representing the sensed solid product weights of said containers, i.e., either overweight, on-weight or underweight containers, to a trend control mechanism which, for each detected and accumulatively summed underweight or overweight signal in excess of a preselected number of accumulatively summed overweight or underweight signals, initiates the operation of a reversible stepping motor which automatically adjusts the automatic filler to dispense the correct weight of solid product. Further, a vertically reciprocable detached section of a cam track located adjacent to the weighing scale is precisely operable to move through preselected rates of acceleration and deceleration to control the placement of successive containers on and off the weighing scale in order to accomplish a high-speed weight control operation compatible with the requirements of a high-speed filling operation.

7 Claims, 4 Drawing Figures

PATENTED MAR 14 1972

INVENTORS
WILLIAM HERBERT CROASDALE
HARLAN SUMNER FRENCH
BY CLEWELL STEPHEN HOFSCHILD
DONALD OWEN JOHNSON

Leonard R. Kohan
ATTORNEY 3,648,741

METHOD AND APPARATUS FOR ACCURATELY DISPENSING VISCOUS PRODUCTS INTO SUCCESSIVE CONTAINERS

BACKGROUND OF THE INVENTION

The present invention relates to the packaging of nonuniform viscous products, and, more particularly, the invention relates to a method and apparatus for accurately dispensing a desired weight of nonuniform viscous food product having both liquid and solid components, such as cottage cheese, into successive containers. Further, the invention particularly relates to a method and apparatus for detecting a trend in the weight of a preselected number of successive containers to either an underweight or overweight condition and correcting the filling of subsequent successive containers to maintain subsequent successive containers within a desired product weight range. Further, the invention particularly relates to a method and apparatus for transferring successive containers between two different paths of travel in order to precisely protect and control the operation of a weighing scale which ensures accurate dispensing of the desired product weight.

Up to the present time, satisfactory apparatus has been developed for the rapid filling of successive containers with nonuniform viscous food products. However, since cottage cheese, and other nonuniform, viscous food products, are usually sold on a weight basis, it is important that the volume of cheese that is placed in each container corresponds quite accurately to the desired product weight. Consequently, frequent variation in the density per unit volume of food products has necessitated the provision of apparatus, distinct and apart from the filling apparatus, for detecting and correcting undesirable weight variations of product in filled containers. However, such weight detecting apparatus has heretofore imposed substantial limitations on the speed at which the filling operation may be performed where dispensing accurate product weight is the goal, as well as high speed filling operation.

The present invention provides in combination with high speed filling of successive containers an automatic weight control system which is sensitive to the weight of product in each container and which provides assurance that the containers will always be filled on or above the desired product weight. The weight control system is designed to perform its function within the time period allotted for the filling operation so that the provision of this control feature does not limit the high speed characteristic of the total system as is the case in conventional filling and weighing systems. The present invention also provides for economy by maintaining the weights of successive containers to within plus or minus 2 gram range of the desired product weight, which is equivalent to approximately one-sixteenth of an ounce. Variations allowed by conventional systems are anywhere from ¼ ounce to ¾ ounce.

SUMMARY OF THE INVENTION

The present invention provides a method and apparatus for dispensing a desired weight of a nonuniform viscous product having both liquid and solid components into successive containers wherein containers carriers slidably mounted within vertical grooves defined in consecutively spaced plates linked together comprise a conveyor which intermittently moves successive containers through and dwells said containers in three product filling stations along a horizontal path of travel adjacent to which the container carriers ride on a cam surface defined in a horizontal track.

First and second solid product fillers located respectively at the first and second filling stations provide successive containers with a quantity of solid product within a desired weight range.

A third trim filler at the third filling station provides a final increment of liquid product to bring the total quantity of product in successive containers within a desired total product weight range.

A weighing scale located at the third filling station regulates the third trim filler to provide the final increment of product, if needed, and also sends voltage signals representing solid product weights of successive weighed containers to a trend control mechanism which detects a trend in solid product weights of a preselected number of weighed containers away from the desired solid product weight range. For each detected and accumulatively summed voltage signal indicating either an overweight or underweight condition existing in said weighed containers in excess of a preselected number of accumulatively summed overweight or underweight signals, the trend control mechanism initiates the operation of a stepping motor for a prescribed period of time corresponding to the number of signals accumulated in excess of the preselected number to automatically adjust the stroke length of a reciprocable piston within a volumetric measuring cylinder which determines the quantity of solid product delivered to subsequent successive containers by the second filler in order to dispense such an adjusted quantity of solid product that will bring the solid product weight of subsequent successive containers within the desired solid product weight range.

Also at the third filling station, a detached section of the horizontal track is vertically reciprocable to transfer successive containers between their horizontal path of travel and a dwell position upon the weighing scale via a vertical path of travel by sliding successive container carriers in the vertical groove defined in the conveyor plates. A driving mechanism moves the detached track section in a particular controlled manner in order that successive containers move into and out of contact with a platform of the weighing scale at preset rates of deceleration and acceleration, respectively, specifically selected to avoid any possible unbalancing effects which otherwise might result from contacting successive containers moving at uncontrolled momentums with the platform of the weighing scale.

DETAILED DESCRIPTION OF THE PREFERRED EMBODIMENT

Figure 1:
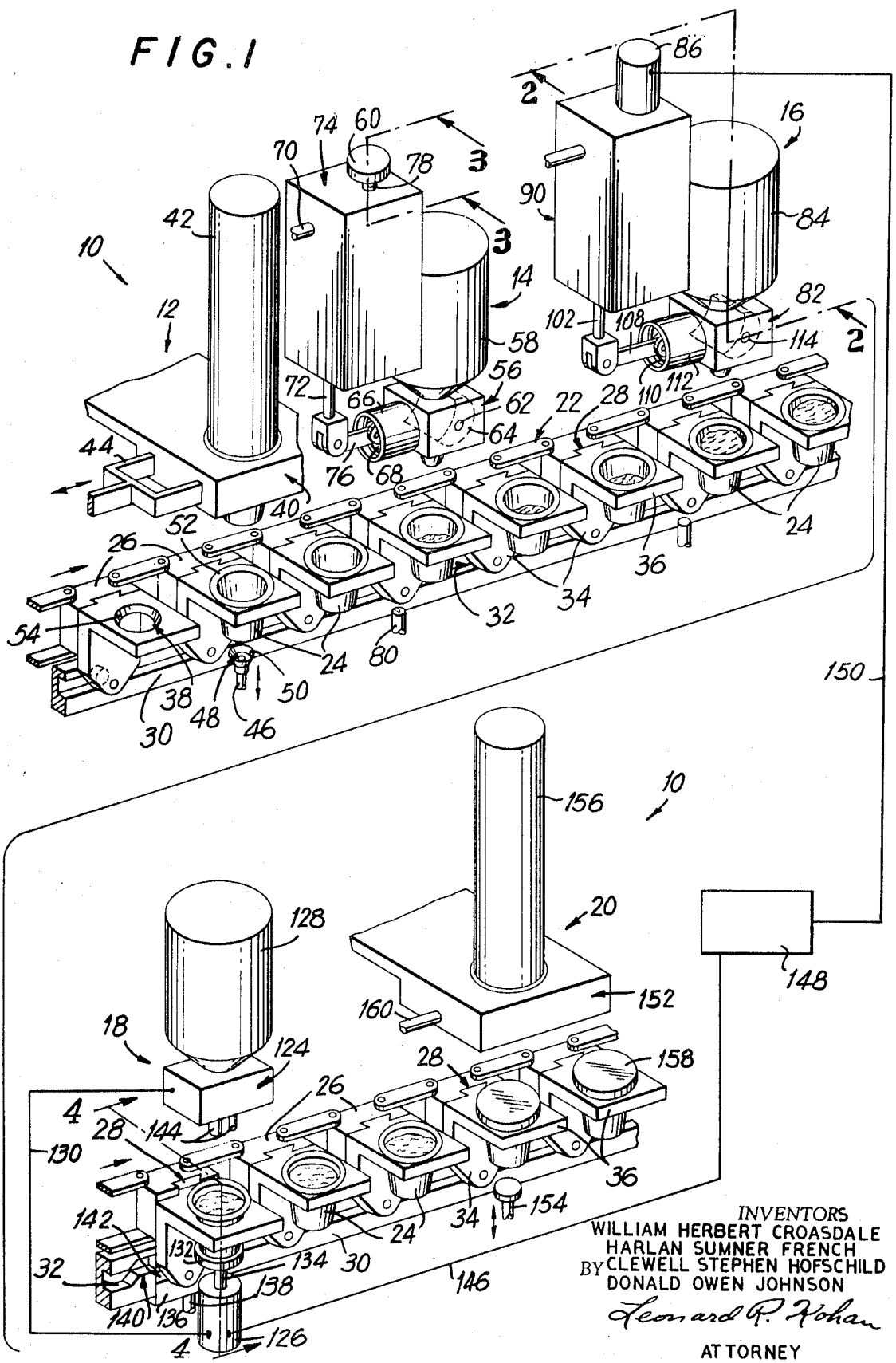
FIG. 1 is a perspective view of the present invention.

In FIG. 1, an overall packaging operation, generally designated 10, is carried out at five stations, generally designated 12, 14, 16, 18, 20, each performing a particular step in the overall packaging operation 10. The vehicle for the packaging operation 10 is a conveyor, generally designated 22, which transports successive containers 24 from station to station through the packaging operation 10. The conveyor 22, which preferably moves through a fixed endless path from left to right as shown, is intermittently advanced by a suitable drive means (not shown). The particular steps in the packaging operation 10, occurring at respective stations 12, 14, 16, 18, 20, which will be described hereinafter in greater detail, are timed, in alternate relation to the intermittent movement of the conveyor 22, to transpire during intermittent dwells of the conveyor 22.

As stated above, the conveyor 22 is preferably moved through a fixed endless path from left to right as shown in FIG. 1. The conveyor 22 is partially comprised by consecutively spaced plates 26 linked to one another around the endless path, each plate 26 having a vertical groove 28 defined therein. The fixed endless conveyor path is aligned substantially parallel to a track 30 having a cam groove surface 32 defined therein. Container carriers 34 for holding containers 24 are slidably mounted in the vertical grooves 28 of the conveyor plates 26 to ride through the endless conveyor path on the cam groove surface 32 of the horizontal track 30. Each of the carriers 34 have a support plate 36 extending horizontally outwardly therefrom, each support plate 36 having an opening 38 defined therein for receiving and holding a container 24 while it is transported by the conveyor 22 through the packaging operation 10. Consequently, the conveyor 22 intermittently moves successive containers 24 along a first fixed path of travel, which is substantially horizontal, from left to right as shown in FIG. 1, through the stations 12, 14, 16, 18, 20 and intermittently dwells said containers 24 in the first fixed path of travel for a preselected period of time at each of the stations 12, 14, 16, 18, 20 during which period of time the steps of the packaging operation 10 are performed, with the first fixed path of container travel accordingly being substantially parallel to the fixed endless path of conveyor travel.

In the preferred embodiment of the present invention, as stated hereinbefore, FIG. 1 illustrates the overall packaging operation 10 comprised of five separate stations 12, 14, 16, 18, 20 at each of which occurs a particular packaging activity. The distance between the centers of the packaging activities of any two stations is substantially some multiple of the distance between the centers of any two consecutive openings 38 defined in the carrier support plates 36 mounted on the conveyor 22. Further, each intermittent movement of the conveyor 22 advances the conveyor 22 through a distance substantially equal to the distance between the centers of any two consecutive openings 38 in the support plates 36 mounted on the conveyor 22. As a result of this arrangement, all of the successive openings 38 of the carrier support plates 36 will eventually become substantially aligned with the center of each of the packaging activities carried out at the five stations 12, 14, 16, 18, 20 during intermittent dwells of the conveyor 22 at some time during the packaging operation 10, since the center of the packaging activity performed at a container supply station, generally designated 12, is initially aligned with the opening 38 defined in one of the support plates 36.

The packaging activity which occurs at the container supply station 12 is performed by a container supply mechanism 40. The top of the supply mechanism 40 is connected in communication with a container stack holder 42 in which successive containers 24 are aligned in a stack fashion for subsequent successive delivery by the supply mechanism 40 into the openings 38 of the support plates 36 of the conveyor 22 during successive intermittent dwells of the conveyor 22. A reciprocable U-bar 44 extends into the container supply mechanism 40 to actuate the operation of the supply mechanism 40 to deliver successive containers 24 to the openings 38 in successive plates 36, the reciprocable U-bar 44 itself being actuated in a timed relation coincident with successive intermittent dwells of the conveyor 22 by any suitable drive means (not shown).

Axially aligned with the container supply mechanism 40 at a position below the support plate opening 38 is a reciprocable vacuum feed plunger 46 which positively assists the supply mechanism 40 in delivering successive containers 24 to the conveyor 22. During an intermittent dwell of the conveyor 22, suitable drive means (not shown) moves the plunger 46 vertically upwardly through the carrier support plate opening 38 to vacuum grasp the bottom of a container 24 simultaneously as the reciprocable U-bar 44 actuates the supply mechanism 40 to release a lowermost container 24 of a stack of containers (not shown) within the holder 42. The feed plunger 46 has an integral vacuum supply path 48 defined therein whereby suitable vacuum pump means (not shown) creates a vacuum condition within a suction cup 50 positioned on the upper end of the plunger 46 when the cup 50 contacts the bottom of the lowermost container 24 at the end of the upward movement of the plunger 46. Then, upon the release of the lowermost container 24, the plunger 46 retracts downwardly out of the opening 38 to positively deliver the container 24 to a nesting position within the carrier support plate opening 38 at which time the vacuum condition within the suction cup 50 is exhausted to the atmosphere by another suitable vacuum means (not shown). The diameter of the support plate opening 38 is preferably substantially equal to the diameter of the container 24 just below the container brim 52 so that the container 24, nesting in the support plate opening 38, contacts the edge 54 which defines the opening 38 in the plate 36 just below the container brim 52.

A manually adjustable solid product filler 56 for partially filling successive containers 24 is located at a first filling station, generally designated 14. The center of the packaging activity being performed at the first filling station 14 by filler 56 is substantially axially aligned in the vertical direction with opening 38 of the support plates 36. The top of the filler 56 is connected in communication with product supply tank 58 to receive solid product therefrom for delivery of a preset quantity to a container 24 which is stationarily positioned below the filler 56 during an intermittent dwell of the conveyor 22.

Figure 3:
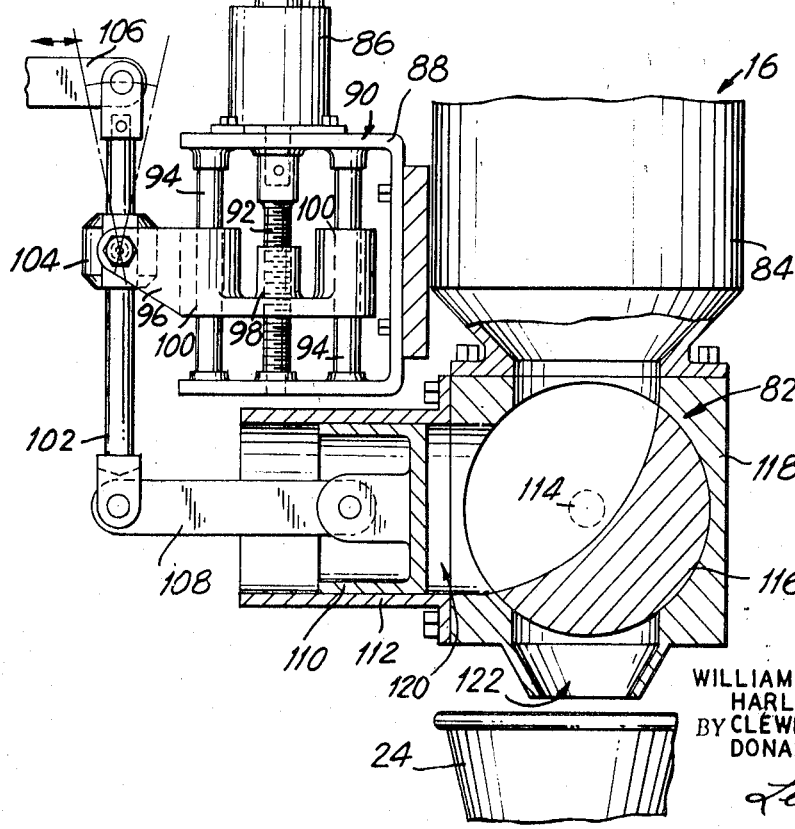
FIG. 3 is an enlarged fragmentary view taken substantially along line 3—3 of FIG. 1.

A rotatable wheel 60, shown also in FIG. 3, preferably manually actuated, is used to adjust and preset the quantity of solid product which will be delivered by filler 56 to each successive container 24 during each filling cycle of the filler 56. A reciprocably rotatable shaft 62 actuated by suitable drive means (not shown) operates a valve 64 (shown in outline form) located within the filler 56 through repetitive filling cycles in a timed relation coincident with successive intermittent dwells of the conveyor 22 wherein successive containers 24 are stationarily positioned and aligned below the filler 56 to receive the preset quantity of solid product from the filler 56.

The filler 56 further includes a cylinder 66 and a piston 68 wherein the length of the piston stroke in the rearward direction within the cylinder 66 will determine the preset quantity of solid product that will be delivered to the containers 24 on the subsequent stroke of the piston 68 in the forward direction.

A reciprocatory drive means 70 provides reciprocatory motion to the piston 68 in a timed relation intermittently coordinated with the reciprocatory movement of the rotatable shaft 62. The coordinated movement of the piston 68 with the movement of the valve 64 located within the filler 56 will be more fully described hereinafter in the description of the second filling station 16 as further illustrated in specific detail in FIG. 2. The drive means 70 provides a reciprocatory motion to one end of a link shaft 72 which is pivotably mounted within a mechanical piston stroke length adjustment mechanism, generally designated 74, and the other end of which is rotatably connected to one end of a piston shaft 76. The rotatable wheel 60 is attached to the outer end of a shaft 78 which extends into the mechanical adjustment mechanism 74. Rotation of the wheel 60 by an operator will move the pivotal point of the link shaft 72 (see FIG. 2 which illustrates the specific details of the second filling station 16) and thereby change the length of the stroke of the piston 68. Therefore, by manually rotating the wheel 60, an operator can determine the quantity of solid product which the filler 56 will deliver to the container 24.

Further, a reciprocable lifter 80 actuated by suitable drive means (not shown) may optionally be provided to operate in a timed relation coordinated with the filling cycle of the filler 56, i.e., to the movement of the piston 68 and the filler valve 64, first, to elevate the container 24 from its first fixed path of travel to a position adjacent the lower end of the filler 56 before the filling cycle commences by positively lifting the container carrier 34 to slide upward in the vertical groove 28 defined in the conveyor plate 26, second, to maintain the carrier 34, and thus the container 24, in this elevated position for the duration of the solid product filling cycle and, third, to lower the container 24 to its initial position within the first fixed path of container travel. An upper portion of the track 30 (not shown) would be omitted immediately below and adjacent to the filler 56 in order to allow the carrier 34 which rides on the cam groove surface 32 of the track 30 to be lifted upward by the reciprocable lifter 80. The same arrangement could optionally be provided at the second filling station 16.

In the preferred embodiment of the present invention, successive containers 24 which are capable of being filled with 16 ounces of product are preferably filled by the filler 56 with approximately 8 ounces of solid product at the first filling station 14. However, it must be noted that carriers 34 with other sizes of support plate openings 38 may be interchanged according to the size of containers desired to be packaged with a nonuniform viscous product.

An automatically adjustable solid product filler 82 for partially filling successive containers 24 is located at a second filling station, generally designated 16. The center (not illustrated) of the packaging activity being performed at the second filling station 16 by filler 82 is substantially axially aligned in the vertical direction with openings 38 defined in successive carrier support plates 36. The top of the filler 82 is connected in communication with a solid product supply tank 84 to receive solid product therefrom for delivery of a preset quantity to a container 24 which is stationarily positioned below the filler 82 during an intermittent dwell of the conveyor 22.

Figure 2:
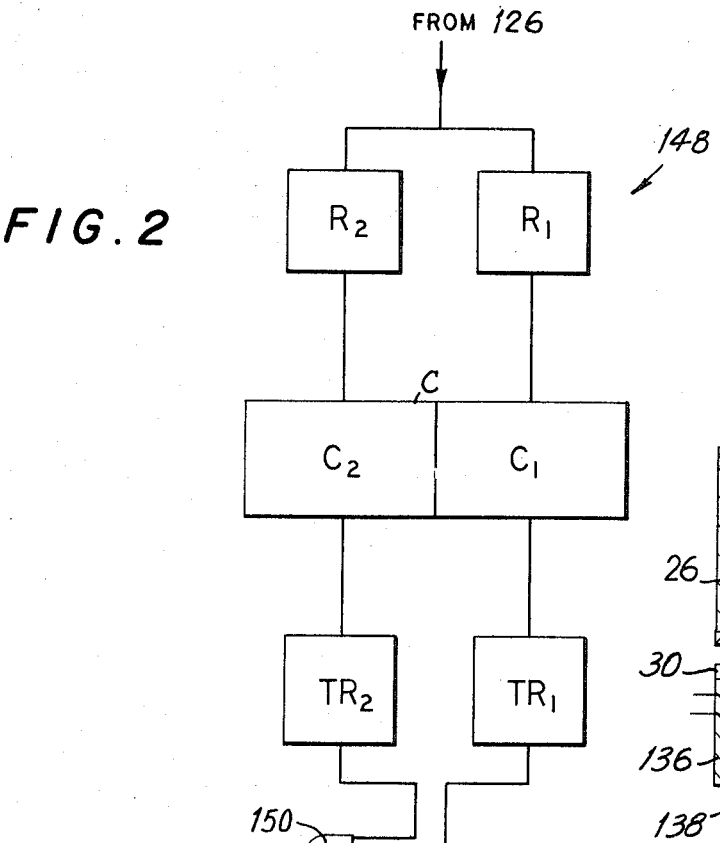
FIG. 2 is an enlarged sectional view taken substantially along line 2—2 of FIG. 1 including associated electrical circuitry of the present invention.

The second filling station 16 is substantially identical to the first filling station 14 except for the automatic adjustment feature of the filler 82 at the second station 16 as compared to the manual adjustment feature of the filler 56 at the first station 14. The mechanical details of the second filling station 16 along with its associated electrical circuitry, which will be described later, are illustrated by FIG. 2. The mechanical details of the second station 16 differ from those of the first station 14 only by the absence of the rotatable wheel 60 shown in FIG. 3 and, in its place, the provision of a reversible stepping motor 86 which automatically adjusts and presets the quantity of solid product which will be delivered by the filler 82 to each successive container 24 during each filling cycle of the filler 82 in accordance with the electrical operation of its associated circuitry.

The stepping motor 86 is attached to a frame 88 which supports the internal structural elements of the mechanical piston stroke length adjustment mechanism, generally designated 90, and operably connected to a threaded rotatable shaft 92. Two parallel guides 94 are mounted on the frame 88 in a parallel arrangement to the rotatable threaded shaft 92. A pivot support member 96 has a threaded central bore 98 (shown in outline form) which threadably receives the threaded shaft 92, and two bores 100 (shown also in outline form) on either side of the central threaded bore 98 and parallel thereto which respectively receive the two parallel guides 94. A link shaft 102 is pivotably mounted on one end of the pivot support member 96 by being slidably engaged within a central bore (not shown) of a holder 104 which is rotatably mounted on said one end of the pivot support member 96. Further, one end of the link shaft 102 is reciprocably driven by a drive means 106 between fixed limits (indicated by the broken lines in FIG. 2), and the other end of the link shaft 102 is rotatably connected to one end of a piston shaft 108. Rotation of the stepping motor 86 will rotate the threaded shaft 92 and cause the pivot support member 96 consequently to move therealong. A change in the position of the pivot support member 96 consequently changes the pivotal point of the link shaft 102 and thus the length of the piston stroke since the drive means 106 reciprocably moves its associated end of the link shaft 102 through a constant displacement.

The reciprocatory drive means 106 provides reciprocatory motion to a piston 110 slidably mounted within a cylinder 112 in a timed relation intermittently coordinated with a reciprocatory rotatable shaft 114 which operates a valve 116 rotatably mounted in a housing 118. As presently illustrated in FIG. 2, the valve 116 is positioned to communicate the solid product storage tank 84 with the volumetric measuring cylinder 112. Movement of the piston 110 from right to left will draw a measured quantity of solid product into the chamber 120 of the cylinder 112. Thereafter, rotation of the valve 116 in a counterclockwise direction through an approximately ninety degree arc will communicate the chamber 120 which is now filled with a measured quantity of solid product with the orifice 122 of the filler 82 for delivery of the measured quantity of solid product on the subsequent forward stoke of the piston 110 to a container 24 positioned below the orifice 122.

The reciprocably rotatable shaft 114 is actuated by suitable drive means (not shown) to operate the valve 116 in an intermittently coordinated relation to the operation of the piston 110 by the reciprocatory drive means 106 through respective filling cycles in a timed relation coincident with successive intermittent dwells of the conveyor 22 whereby successive containers 24 are stationarily positioned and aligned below the orifice 122 of the filler 82 to receive the preset quantity of solid product at the second filling station 16.

In the preferred embodiment of the present invention, successive containers 24 which are capable of being filled with 16 ounces of product are preferably filled with approximately 7½ to 8 ounces of solid product at the second filling station 16. Furthermore, it is preferred that the total weight of solid product now packaged in successive containers 24 will be approximately 15½ to 16 ounces in order that a third trim filling station, generally designated 18, which will be described hereinafter, will only be required to deliver a final increment of desired product weight in the form of liquid product within a zero to approximately ½ ounce weight range.

The trim filler 124 located at the third filling station 18 provides the final increment of desired product weight in the form of liquid product to successive containers 24. The center (not illustrated) of the packaging activity performed at the third filling station 18 by the trim filler 124 is substantially axially aligned in the vertical direction with openings 38 defined in successive support plates 36, and, further, with the vertical axis of a weighing scale, generally designated 126, which is disposed below the center of the support plate opening 38. The top of the trim filler 124 is connected in communication with a liquid product supply tank 128 to receive liquid product therefrom for delivery to a container 24 when stationarily positioned below the trim filler 124 during an intermittent dwell of the conveyor 22.

The trim filler 124 is operated and controlled by the weighing scale 126 being electrically connected therewith by lead 130. The weighing scale 126 includes a platform 132, mounted on a vertically reciprocable shaft 134 which extends above the scale 126, for supporting successive containers 24 during the performance of both the weighing operation by scale 126 and the filling operation by trim filler 124.

As stated above in connection with the description of the conveyor 22, each of the container carriers 34 rides on the horizontal cam groove surface 32 of the track 30. Consequently, the conveyor 22, which is partially comprised by successive container carriers 34, intermittently moves successive containers 24 along a first fixed path of travel, which is substantially horizontal, from left to right as shown in FIG. 1, and intermittently dwells said containers 24 in the first fixed path of travel for a preselected period of time at each of the stations 12, 14, 16, 18, 20 simultaneously with the first fixed path of container travel accordingly being substantially parallel to the fixed endless path of conveyor travel.

A critical feature in the present invention is the particular manner in which successive containers 24 are placed on and off the platform 132 of the weighing scale 126. A detached section 136 of the horizontal track 30 connected with a drive shaft 138 can be vertically reciprocated through precisely controlled rates of deceleration and acceleration by suitable drive means (not shown) in placing successive containers 24 on the scale platform 132 and in taking said containers 24 from the scale platform 132. In this way, successive containers 24 are moving at magnitudes of deceleration and acceleration very close to zero immediately before coming into contact with the platform 132 and immediately upon breaking contact with the platform 132, respectively. Accordingly, the detached track section 136, when lowered by drive shaft 138, carries therewith the container carrier 34 which vertically downwardly slides in the vertical groove 28 defined in the conveyor plates 26.

Figure 4:
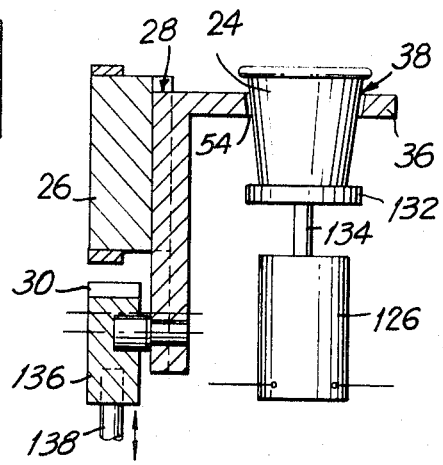
FIG. 4 is an enlarged sectional view taken substantially along line 4—4 of FIG. 1.

FIG. 4 illustrates the relative positions of the respective elements when the detached track section 136 has reached the lower limit of its downward movement and has positioned the container 24 on the scale platform 132. In this position the container 24 no longer contacts the edge 54 of the support plate 36 which defines the opening 38 therein, the container 24 being unsupported by any means other than the scale platform 132. Consequently, the vertical reciprocable movement of the container carrier 34 in the groove 28 of a conveyor plate 26 at the third filling station 18, which occurs concurrently with the dwell of other of the container carriers 34 during the preselected time period along the first fixed path of container travel at the first and second filling stations 14, 16, defines a second fixed path of container travel, which is substantially vertical. Also the period of time in which a container 24 dwells in the second fixed path, or, in other words, on the scale platform 132 for the duration of the weighing and trim filling operation, is less than the preselected period of time in which some of the successive containers dwell in the first fixed path at the first and second filling stations 14, 16. Therefore, the high speed filling goal of the total packaging operation 10 is not limited by the weighing operation performed at the third filling station 18.

Additionally, portions 140 of the cam groove surface 32 of the horizontal track 30 immediately on either side of the detached track section 136 may optionally be gradually elevated in profile to coincide with an elevated profile of the cam groove surface 142 within the detached track section 136.

The above described manner of placing containers 24 on and off the scale platform 132 allows for a very gentle, soft contacting of the container 24 with the scale platform 132 which thereby avoids any possible deleterious, unbalancing effects detrimental to a weighing operation which occur as a result of a conventional transfer method wherein the containers are dragged on and off the platform of the weighing scale.

The weighing scale 126 controls the operation of the trim filler 124 in the following way. First, the scale 126 weighs a container 24 to detect the need for providing a final increment of product weight. Second, if a container 24 is found to be under the desired final product weight, the scale 126 sends an electrical voltage output proportional to the underweight condition of the container 24 via lead 130 to the trim filler 124 to initate incremental liquid product filling of the container 24. Third, the scale 126 continuously weighs the container 24 and sends an electrical voltage output directing the trim filler 124 to concurrently fill the container 24 with liquid product. Fourth, when the desired final product weight has been detected by the scale 126, the scale 126 discontinues sending any electrical voltage output via lead 130 to the trim filler 124 whereby the incremental filling of the container 24 by the trim filler 124 terminates.

In the liquid supply tank 128 which is connected to communicate with the trim filler 124, liquid product is maintained under constant low pressure so that when the trim filler 124 is actuated into operation by the weighing scale 126, the trim filler 124 will deliver a precise amount of liquid product for a given period of time in which the filler 124 is in operation. In other words, the constant low pressure system allows for a measurable flow rate of liquid product during the time period of incremental product fill. The basic principle involved is to open a valve (not shown), or two valves if a large increment of liquid product is needed, within the trim filler 124 for the period of time necessary to bring a container 24 up to the desired total product weight. Dual orifices 144 with wide openings (not shown) are provided for the two valves (not shown) within the trim filler 124 in order that the flow pattern of the issuing liquid product will simulate a large diameter, non-turbulent flowing stream such as a low pressure stream of water issuing from a garden hose. Further, the liquid product is kept under a low pressure so that the impact of liquid product with the solid product already in a container 24 will not have an unbalancing effect on the weighing operation.

As stated above, the scale 126 initially weighs a container 24 for the purpose of detecting the need to provide a final increment of product weight. Also, the scale 126 performs this initial weighing operation for another purpose which is to provide a total solid product weight measurement. The scale 126 sends a continuous electrical voltage output representing the total solid product weight measurements of successive weighed containers 24 via lead 146 to a trend control mechanism 148. The trend control mechanism 148 controls the operation of the reversible stepping motor 86 at the second filling station 16 being electrically connected therewith via lead 150. As stated above in connection with the description of the second filling station 16, the reversible stepping motor 86 automatically adjusts the mechanical adjustment mechanism 90 which determines the quantity of solid product which will be delivered by the filler 82 to successive containers 24.

Timing means (not shown) within the trend control mechanism 148 allows the mechanism 148 to be receptive to the continuous voltage output of the scale 126 for only an instantaneous preselected period of time after the scale 126 commences the weighing operation. Accordingly, the electrical response which is received by the trend control mechanism 148 is in the form of an instantaneous voltage signal of a specific amplitude or magnitude.

As illustrated in FIG. 2, the trend control mechanism, generally designated 148, basically provides alternate electrical routes for the receipt and transmission of voltage signals. The route which a particular voltage signal takes, if it takes one at all, depends upon the voltage magnitude of the signal. Voltage signals representing underweight and overweight conditions of solid product filled containers 24 are of magnitudes respectively below and above a preselected range of voltage magnitudes which represent an on-weight condition in the solid product fill of the containers 24. Accordingly, the alternate electrical routes provided by the trend control mechanism 148 correspond to underweight and overweight conditions of solid product filled containers 24. If the magnitude of a particular voltage signal is within the on-weight range, the signal takes neither of the alternate routes whereby the trend control mechanism 148 does not respond, but instead merely remains in its prior condition.

In the trend control mechanism 148, relay units R , R, are respectively preset to respond to voltage signals of magnitudes above and below the preselected on-weight range. The relay units $R_1$, $R_2$ are connected respectively to sides $C_1$, $C_2$ of an add-subtract counter C. The relay units $R_1$, $R_2$ respond to voltage signals, sent by the weighing scale 126, of magnitudes that are within their respective preset ranges, which respectively represent overweight and underweight containers 24. The relay units $R_1$, $R_2$ do not respond to voltage signals of magnitudes within the range which represents on-weight containers 24. For each voltage signal received, one of the relay units $R_1$, $R_2$ impulses a corresponding one of the sides $C_1$, $C_2$ of the add-subtract counter C with a control signal which the one of the sides $C_1$, $C_2$ sums and holds as a numerical count by the one side. For each control signal received by the one of the sides $C_1$, $C_2$ of the add-subtract counter C and summed to the numerical count of the one side, a numerical count is subtracted from the other side of the add-subtract counter C. A particular sum of numerical counts by either of the sides $C_1$, $C_2$ is preselected to represent the development of an accumulative trend to either an overweight or underweight condition in the solid product fill of successive weighed containers 24. Whenever the preselected sum of numerical counts has registered with one of the sides $C_1$, $C_2$, the respective one of the sides $C_1$, $C_2$ of the add-subtract counter C directly transfers control signals subsequently received from the corresponding one of the relay units $R_1$, $R_2$ which are accumulatively in excess of the preselected sum to a corresponding one of the time relays TR₁, TR₂. The corresponding one of the time relays TR₁, TR₂ specifies a time period, that corresponds to the number of transferred control signals it receives, and thereby the number of steps, through which the reversible stepping motor 86 will be operated to rotate the threaded shaft 92 within the mechanical adjustment mechanism 90 to correctly adjust the solid product fill at the second filling station 16.

Finally, it should be understood from the above discussion of the trend control mechanism 148, that the electrical voltage signal fed by the scale 126 to the trend control mechanism 148 has no bearing on the desired final product weight of the container 24 currently being filled and weighed, but has a possible bearing only on successive containers 24 which will subsequently undergo the second solid product filling operation at the second filling station 16. That is to say, if the trend control mechanism 148 registers a number of underweight containers 24, preferably four or more, then the trend control mechanism 148 sends an electrical impulse via lead 150 to actuate the operation of the stepping motor 86 to adjust the mechanical piston stroke length mechanism 90 to provide an increase in the quantity, and thus the weight, of solid product that will be delivered by the filler 82 to successive containers 24 at the second filling station 16. Conversely, should the trend control mechanism 148 register a number of overweight containers 24, preferably four or more, then the trend control mechanism 148 will electrically actuate the operation of the reversible stepping motor 86 in order to decrease the quantity of solid product that will be delivered by filler 82 to successive containers 24 at the second filling station 16.

Thus the concept involved in the use of the trend control mechanism 148 is to provide a means for adjusting the product weight delivered to subsequent successive containers 24 in response to the weight accumulative trend in successive containers 24 previously filled.

In the preferred embodiment of the present invention, successive containers 24 which are capable of being filled with 16 ounces of product are preferably filled with approximately 7½ to 8 ounces of solid product at the second filling station 16. If this is accomplished to bring the total solid product weight to approximately 15½ to 16 ounces, then a trim fill of liquid product within a 0 to ½ ounce range, depending on the final increment of product weight needed, can easily be carried out at the third filling station 18 within the time period of an intermittent dwell of the conveyor 22, such time period being approximately ⅓ second.

A cap applicator mechanism, generally designated 152, located at a capper station, generally designated 20, performs the final packaging activity in the overall packaging operation 10. The center (not illustrated) of the packaging activity performed at the capper station 20 by the cap applicator mechanism 152 is substantially axially aligned in the vertical direction with the opening 38 defined in the carrier support plate 36 when it is stationarily positioned within the capper station 20 during an intermittent dwell of the conveyor 22 and, further, with the axis of a reciprocable lifter 154 which is disposed below the center of the opening 38. The top of the cap applicator mechanism 152 is connected in communication with a cap supply stack 156 to receive successive caps 158 therefrom for delivery to successive containers 24.

A reciprocatory rotatable shaft 160 actuated by suitable drive means (not shown) operates the cap applicator mechanism 152 in a timed relation coincident with successive intermittent dwells of the conveyor 22 whereby each successive container 24 is stationarily positioned and aligned below the cap applicator mechanism 152 to be fitted with the cap 158.

Further, the reciprocable lifter 154 actuated by suitable drive means (not shown) operates in a timed relation concurrent with the cap dispensing cycle of the cap applicator mechanism 152, first, to elevate a container 24 to a position adjacent the lower end of the cap applicator mechanism 152 before the cap dispensing cycle commences, second, to hold the container 24 in this elevated position for the duration of the cap dispensing cycle, and, third, to lower the container 24 to its initial position within the support plate opening 38.

After successive containers 24 have been closed by the cap applicator mechanism 152, the packaging operation 10 is completed. Suitable means (not shown) may be provided to remove successive closed containers 24 from their nesting position within the carrier support plates 36.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

We claim:

1. A method of accurately dispensing a desired weight of viscous product into successive containers, comprising the steps of:

intermittently moving successive containers along a first path through a plurality of stations;

intermittently dwelling successive containers in the first path for a preselected period of time at the plurality of stations;

partially filling successive containers with a quantity of product while said containers dwell in the first path at a first station;

further partially filling successive containers with an automatically adjustable quantity of product while said containers dwell in the first path at a second station to bring successive containers within a desired product weight range;

transferring successive containers between the first path and a second path at a third station concurrently with the dwell of successive containers during said preselected time period in the first path at said first and second stations, said transferring of said successive containers being affected by moving successive containers along the second path to and from a dwell position therein at controlled rates of deceleration and acceleration, respectively, to avoid causing any possible deleterious effects upon an intervening weighing step, and dwelling successive containers in the second path for a period of time which is less than said preselected period of time in which successive containers dwell in the first path at said first and second stations;

weighing successive containers while said containers dwell in the second path at said third station and producing successive voltage signals representing product weights of said weighed containers;

responding to voltage signals, which are produced by weighing said containers at said third station, of magnitudes within preset ranges, which respectively represent overweight and underweight conditions of the weighed containers by producing a control signal corresponding to each of said voltage signals responded to;

accumulatively summing and holding as numerical counts said control signals such that a control signal, which represents one of either the underweight or overweight condition of the weighed containers, will be added to the numerical count representing the one of said conditions and subtracted from the numerical count representing the other of said conditions, and transferring said control signals which are accumulatively in excess of a preselected number of control signals which represents the development of an accumulative trend to either an overweight or underweight condition in the product fill of successive weighed containers; and receiving said transferred control signals, and then automatically adjusting said partial filling of subsequent successive containers at said second station in order that the weights of successive containers will be within the desired product weight range.

2. A method of accurately dispensing a desired weight of viscous product having both liquid and solid components into successive containers, comprising the steps of:

intermittently moving successive containers along a first path through a plurality of stations;

intermittently dwelling successive containers in the first path for a preselected period of time at the plurality of stations;

partially filling successive containers with a quantity of solid product while said containers dwell in the first path at a first station;

further partially filling successive containers with an automatically adjustable quantity of solid product while said containers dwell in the first path at a second station to bring successive containers within a desired total solid product weight range;

transferring successive containers between the first path and a second path at a third station concurrently with the dwell of successive containers during said preselected time period in the first path at said first and second stations;

weighing successive containers while said containers are in the second path at said third station and producing successive voltage signals representing total solid product weights of said weighed containers;

responding to voltage signals, which are produced by weighing said containers at said third station, of magnitudes within preset ranges which respectively represent overweight and underweight conditions of the weighed containers by producing a control signal corresponding to each of said voltage signals responded to;

transferring said control signals which are accumulatively in excess of a preselected number of control signals which represents the development of an accumulative trend to either an overweight or underweight condition in the solid product fill of successive weighed containers;

receiving said transferred control signals, and then automatically adjusting said partial filling of subsequent successive containers at said second station in order that the weights of successive containers will be within the desired solid product weight range; and trim filling successive containers with liquid product while said containers are in the second path at said third station to provide a final increment of the desired product weight, said trim filling step depending upon said weighing step to sense the need for the final increment fill of liquid product and to regulate said trim filling step in delivering the final increment of liquid product, if needed, to successive containers.

3. A method of accurately dispensing a desired weight of viscous product having both liquid and solid components into successive containers according to claim 2 wherein:

said step of transferring successive containers between the first path and a second path at a third station further comprises the steps of moving successive containers along the second path to and from a dwell position therein at controlled rates of deceleration and acceleration, respectively, to avoid causing any possible deleterious effects upon an intervening weighing step; and dwelling successive containers in the second path for a period of time which is less than said preselected period of time in which successive containers dwell in the first path at said first and second stations;

said step of weighing successive containers at said third station further comprises weighing successive containers while said containers dwell in the second path; and said step of trim filling successive containers at said third station further comprises trim filling successive containers while said containers dwell in the second path.

4. A method of accurately dispensing a desired weight of viscous product having both liquid and solid components into successive containers according to claim 3 wherein there is included between said step of responding to voltage signals of magnitudes within the preset ranges and said step of transferring said control signals, the step of accumulatively summing and holding as numerical counts said control signals such that a control signal, which represents one of either the underweight or overweight condition of the weighed containers, will be added to the numerical count representing the one of said conditions and subtracted from the numerical count representing the other of said conditions.

5. A method of accurately dispensing a desired weight of viscous product having both liquid and solid components into successive containers according to claim 2 wherein there is included between said step of responding to voltage signals of magnitudes within the preset ranges and said step of transferring said control signals, the step of accumulatively summing and holding as numerical counts said control signals such that a control signal, which represents one of either the underweight or overweight condition of the weighed containers, will be added to the numerical count representing the one of said conditions and subtracted from the numerical count representing the other of said conditions.

6. An apparatus for accurately dispensing a desired weight of viscous product into successive containers, comprising:

a conveyor means for intermittently moving successive containers along a first path through a plurality of stations and for intermittently dwelling successive containers in the first path for a preselected period of time at the plurality of stations;

a first station having first means for partially filling successive containers with a quantity of product while said containers dwell in the first path at said first station;

a second station having second means for further partially filling successive containers with an automatically adjustable quantity of product while said containers dwell in the first path at said second station to bring successive containers within a desired product weight range;

a third station having means for transferring successive containers between the first path and a second path and for moving said containers along the second path to and from a dwell position therein concurrently with the dwell of successive containers during said preselected time period in the first path at said first and second stations, said transferring and moving means comprising means for receiving and holding successive containers in the second path concurrently with the dwell of successive containers in the first path at said first and second stations during a period of time equal to said preselected period of time; and means for moving said receiving and holding means to move said containers along the second path in order to bring said containers into and out of contact with said weighing means and for dwelling said receiving and holding means as said containers are being weighed during a period of time which is less than said preselected period of time in which successive containers dwell in the first and second stations, said moving means operable to move said containers into and out of contact with the weighing means at controlled rates of deceleration and acceleration, respectively, in order to avoid causing any possible deleterious effects upon said weighing means;

a trend control means having means for responding to voltage signals, which are produced by the weighing of said containers by said weighing means at said third station, of magnitudes within preset ranges which respectively represent overweight and underweight conditions of the weighed containers and producing a control signal corresponding to each of said voltage signals responded to; and means for accumulatively summing and holding as numerical counts said control signals such that a control signal, which represents one of either the underweight or overweight condition of the weighed containers, will be added to the numerical count representing the one of said conditions and subtracted from the numerical count representing the other of said conditions, and for transferring said control signals which are accumulatively in excess of a preselected number of control signals which represents the development of an accumulative trend to either an overweight or underweight condition in the product fill of successive weighed containers; and means for receiving said transferred control signals from said trend control means to automatically adjust said second partial filling means at said second station to fill subsequent successive containers with such a quantity of product that the weight of successive containers will be within the desired product weight range.

7. An apparatus for accurately dispensing a desired weight of viscous product having both liquid and solid components into successive containers, comprising:

a conveyor means for intermittently moving successive containers along a first path through a plurality of stations and for intermittently dwelling successive containers in the first path for a preselected period of time at the plurality of stations;

a first station having first means for partially filling successive containers with a quantity of solid product while said containers dwell in the first path at said first station;

a second station having second means for further partially filling successive containers with an automatically adjustable quantity of solid product while said containers dwell in the first path at said second station to bring successive containers within a desired total solid product weight range;

a third station having means for transferring successive containers between the first path and a second path and for moving said containers along the second path to and from a dwell position therein concurrently with the dwell of successive containers during said preselected time period in the first path at said first and second stations, said transferring and moving means comprising means for receiving and holding successive containers in the second path concurrently with the dwell of successive containers in the first path at said first and second stations during a period of time equal to said preselected period of time; and means for weighing successive containers while said containers are in said dwell position in the second path at said third station to produce successive voltage signals representing total solid product weights of said weighed containers; and means for moving said receiving and holding means to move said containers along the second path in order to bring said containers into and out of contact with said weighing means and for dwelling said receiving and holding means as said containers are being weighed during a period of time which is less than said preselected period of time in which successive containers dwell in the first and second stations, said moving means operable to move said containers into and out of contact with the weighing means at controlled rates of deceleration and acceleration, respectively, in order to avoid causing any possible deleterious effects upon said weighing means, and third means for trim filling successive containers with liquid product while said containers are dwelling in the second path at said third station to provide a final increment of the desired product weight, said third means depending upon said weighing means to sense the need for the final increment fill of liquid product and to regulated said third means in delivering the final increment of liquid product, if needed, to successive containers;

a trend control means having means for responding to voltage signals, which are produced by the weighing of said containers by said weighing means at said third station, of magnitudes within preset ranges which respectively represent overweight and underweight conditions of the weighed containers and producing a control signal corresponding to each of said voltage signals responded to; and means for accumulatively summing and holding as numerical counts said control signals such that a control signal, which represents one of either the underweight or overweight condition of the weighed containers, will be added to the numerical count representing the one of said conditions and subtracted from the numerical count representing the other of said conditions, and for transferring said control signals which are accumulatively in excess of a preselected number of control signals which represents the development of an accumulative trend to either an overweight or underweight condition in the solid product fill of successive weighed containers; and means for receiving said transferred control signals from said trend control means to automatically adjust said second partial filling means at said second station to fill subsequent successive containers with such a quantity of solid product that the weight of successive containers will be within the desired solid product weight range.

\* \* \* \* \*